United States Patent [19]
Purcell et al.

[11] 3,841,424
[45] Oct. 15, 1974

[54] TRIANGULAR TRACK RESILIENT BOGIE SUSPENSION

[75] Inventors: Robert J. Purcell, Washington; Kenneth E. Wehr, Pekin, both of Ill.

[73] Assignee: Caterpillar Tractor Co., Peoria, Ill.

[22] Filed: June 22, 1973

[21] Appl. No.: 372,829

Related U.S. Application Data

[62] Division of Ser. No. 212,396, Dec. 27, 1971.

[52] U.S. Cl. .................................... 180/9.5, 305/22
[51] Int. Cl. ............................................ B62d 65/12
[58] Field of Search .............. 180/9.5, 9.62; 305/25, 305/22, 29

[56] References Cited
UNITED STATES PATENTS

| | | | |
|---|---|---|---|
| 2,467,947 | 4/1949 | Skelton | 305/22 X |
| 3,082,044 | 3/1963 | Klemm | 305/25 X |
| 3,496,136 | 1/1950 | Smith | 305/25 |

FOREIGN PATENTS OR APPLICATIONS

| | | | |
|---|---|---|---|
| 844,768 | 8/1960 | Great Britain | 305/22 |
| 605,814 | 7/1948 | Great Britain | 305/25 |

*Primary Examiner*—Philip Goodman
*Attorney, Agent, or Firm*—Phillips, Moore, Weissenberger, Lempio & Strabala

[57] ABSTRACT

An assembly for supporting and driving a vehicle with a crawler track has the track chain engaged on a pair of spaced apart idler wheels and a drive sprocket situated between the idlers and upwardly therefrom whereby the chain is maintained in a triangular configuration with the sprocket and drive elements situated well above the abrasive conditions at ground level, the entire assembly being oscillatable relative to the associated vehicle.

To provide good resiliency and recoiling ability under high speed, heavy duty conditions each idler is mounted on one leg of an angled member which is pivoted to a fluid shock absorbing cylinder attached to an oscillatable track frame. Resilient means acting on the other leg comprises compression pads exhibiting a progressive spring rate whereby the idler may shift upwardly or backwardly as necessary to absorb shocks and reduce wear.

Pairs of load carrying track rollers are mounted on bogies pivoted to the other leg of the angled member. In an alternate embodiment the track roller bogies are pivoted directly to the oscillatable track frame.

14 Claims, 11 Drawing Figures

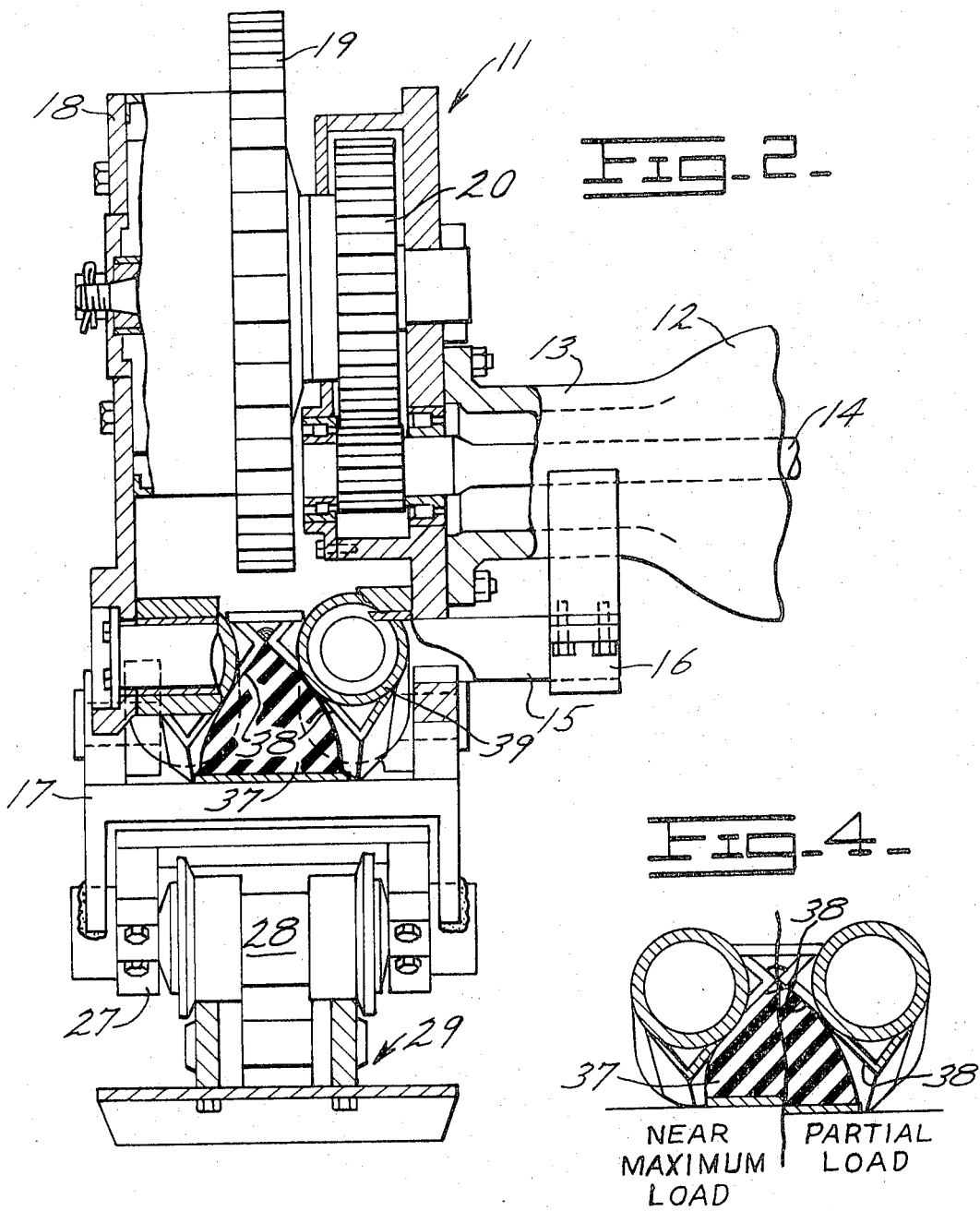

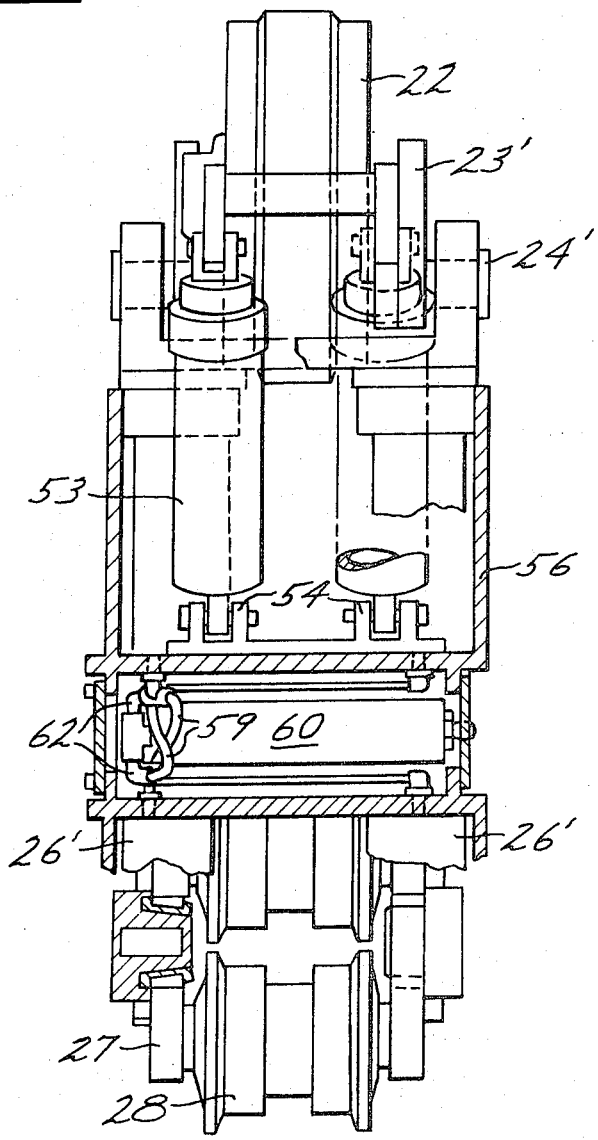

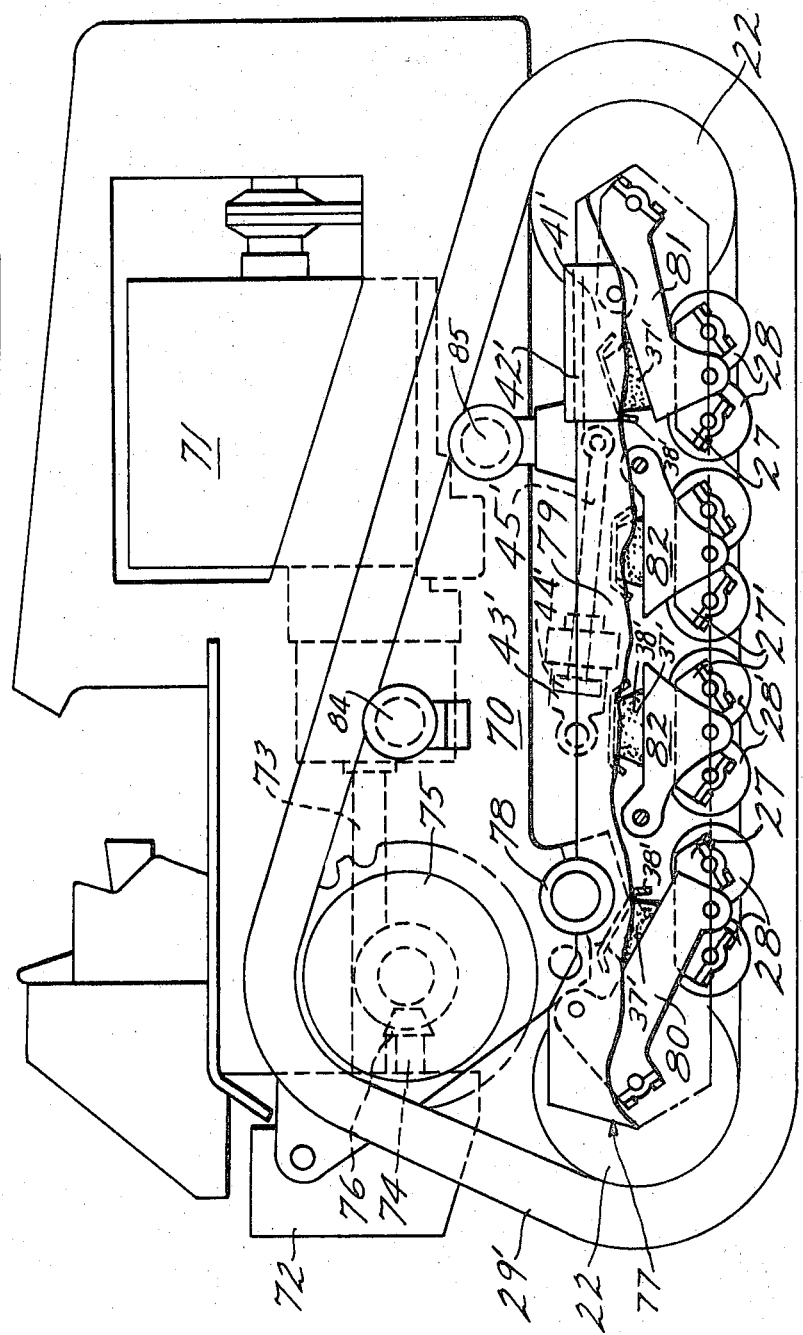

TRIANGULAR TRACK RESILIENT BOGIE SUSPENSION

This is a division, of Ser. No. 212,396, Filed Dec. 27, 1971.

BACKGROUND OF THE INVENTION

This invention relates to crawler vehicles and more particularly to track chain suspensions therefor.

The track chain of most commercial crawler vehicles is usually engaged on a pair of large longitudinally spaced wheels wherein the forward wheel is an idler and the rear wheel is toothed and constitutes the drive sprocket for the chain; smaller roller wheels being distributed between the two major wheels for support and load bearing purposes. It has been recognized that this close proximity of the sprocket and associated drive elements to ground level has adverse effects on durability and other performance factors when highly abrasive conditions are present. Also, such an arrangement requires the vehicle driving sprocket to endure a part of the load of the vehicle as well as driving forces for propelling the vehicle.

To alleviate these problems, track suspensions have heretofore been designed in which the chain is engaged upon two longitudinally spaced idlers with the drive sprocket being a third wheel situated between the two idlers and upwardly therefrom so that the chain is maintained in a substantially triangular configuration, with the sensitive drive elements being well above the ground and relieved of the load forces associated with supporting the vehicle. It has heretofore been recognized that such a configuration may provide greater durability and lessen maintenance problems.

In order to provide for the absorption of shock and for an aggressive, efficient driving action and to provide for maintenance of track chain tension and vehicle stability, the chain supporting elements should be resiliently mounted. Triangular track chain suspensions as heretofore constructed have either lacked the desired degree of resiliency and recoiling ability or have been unduly complex, heavy and costly.

SUMMARY OF THE INVENTION

The present invention is a powered crawler vehicle track chain assembly of the triangular form discussed above which is characterized by extreme resiliency and recoiling ability with a resultant reduction in wear, increased absorption of shock, and provision of an aggressive, efficient driving action on rough terrain and increased speed of operation. The chain is engaged upon longitudinally spaced front and rear idlers and an intermediate elevated drive sprocket is an arrangement wherein the idlers are attached to an oscillatable track frame through a pivotal connection to a fluid shock absorber on the track frame, providing for an essentially longitudinal recoil; and wherein resilient means act on the idler to cushion essentially vertical movements.

Accordingly it is an object of this invention to provide a track chain assembly for crawler vehicles of the form having an elevated drive sprocket between two longitudinally spaced idlers wherein the track exhibits a high degree of resiliency and recoiling ability for operation under difficult conditions.

The invention together with further objects and advantages thereof will best be understood by reference to the following description of preferred embodiments in conjunction with the accompanying drawings.

BRIEF DESCRIPTION OF THE DRAWINGS

In the accompanying drawings:

FIG. 2 is a sectioned view taken along staggered line II—II of FIG. 1;

FIG. 4 is a sectional view of a portion of the mechanism of FIGS. 1 and 2 showing the deformation of a resilient element thereof which occurs under certain operating conditions to be described;

FIG. 10 is a plan section view of the mechanism of FIG. 8 taken along line X—X thereof; and, FIG. 11 is a side elevation of another crawler vehicle illustrating still another embodiment of the present invention.

DESCRIPTION OF PREFERRED EMBODIMENTS

Figure 1:
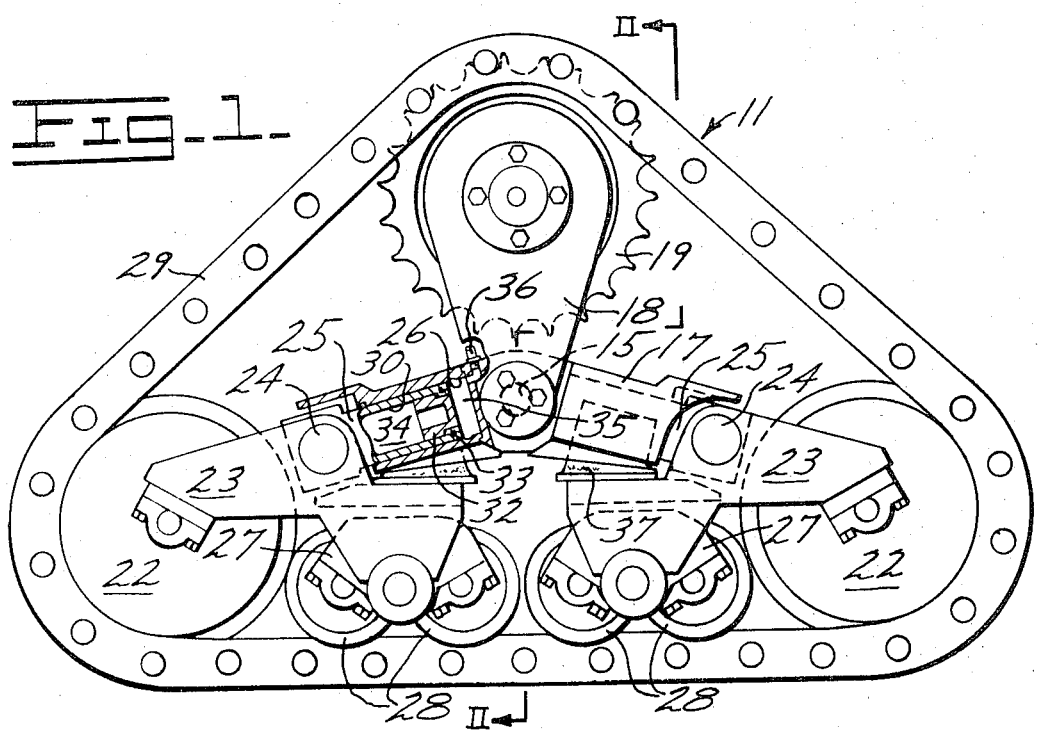
FIG. 1 is a side elevation view of a first embodiment of a crawler vehicle track chain assembly in accordance with the invention with portions of the mechanism broken out.

Referring now to the drawings and more particularly to FIGS. 1 and 2 thereof in conjunction, the track chain assembly 11 of the present invention may be utilized with any of the diverse known forms of crawler vehicles and accordingly only a small portion 12 of such a vehicle is shown for purposes of reference. A suitable vehicle of this form is disclosed, for example, in U.S. Pat. No. 3,435,908.

To attach the ground engaging means to such a vehicle, the vehicle is usually equipped with a sidewardly projecting tubular axle housing 13 having a power drive axle 14 extending axially therefrom. The form of axle housing 13 and drive axle 14 depicted in FIGS. 1 and 2 is commonly employed on certain commercially available articulated earth moving vehicles and was originally designed and is normally employed for attaching powered wheels to the vehicle. The track chain assembly 11 of the present invention is designed to replace such wheels without requiring any major modification of the vehicle itself including the axle housing 13 and drive axle 14.

To attach track chain assembly 11 to the vehicle, a main pivot shaft 15 is secured to the end of the axle housing 13 by a bracket 16 and housing 18. A track frame 17 is oscillatably carried on the pivot shaft and has ends which extend forwardly and rearwardly from the shaft.

Also secured to the end of the axle housing 13 is a housing 18 rotatably mounting a drive sprocket 19 which is connected to drive axle 14 through reduction gearing 20 mounted in housing 18 adjacent the drive sprocket.

Front and rear idlers 22 are rotatably mounted on one end of idler support members comprising cranks 23 which are pivotally and reciprocally mounted at intermediate points on the forwardly and rearwardly extending ends of track frame 17 by means of trunnions 24 attached to recoil pistons 25 slidable within hydropneumatic cylinders 26 provided in the track frame ends.

Bogies 27 are pivotally mounted on the other ends of cranks 23. The bogies in turn carry pairs of track rollers 28 which support the vehicle.

A conventional track chain 29 encompasses idlers 22, track rollers 28 and drive sprocket 19 and is maintained at a proper operating tension by the hydropneumatic cylinders 26. Pistons 25, which are disposed within cylinders 26 in turn have cylinders 30 provided therein. Pilot pistons 32 slidable in cylinders 30 against a retainer 33, define gas precharge chambers 34 which are filled with gas at a pressure sufficient to maintain the track at the proper operating tension.

Piston 25, pilot pistons 32 disposed within pistons 25, and cylinders 26 define a fluid chamber 35 which is filled with sufficient fluid to maintain the track chain 29 at the proper operating tension. Chambers 35 may be filled with fluid by means of conduits 36.

When a foreign object gets between the track and an idler, retraction of an idler is necessary to prevent excessive tension in the track chain. The foreign object, bearing on the idler, will urge piston 25 inwardly against the pressure of the fluid in chamber 35. The resulting increased fluid pressure in chamber 35 displaces pilot piston 32 against the gas precharge in chamber 34, permitting piston 25 to slide inwardly into cylinder 26, and allowing recoil of the idler 22.

After the object has been ejected, the gas pressure in chamber 34 returns piston 32 against retainer 33, causing the fluid in chamber 35 to return piston 25 and idler 22 to their initial positions.

Cushioning of the track rollers is provided by wedge-shaped compression pads 37 disposed on the upper surfaces of the bogey-supporting ends of the cranks 23. The compression pads project upwardly between the cylinders 26 where they are engagable by plates 38 which are an integral part of cylinder housings 39 enclosing cylinders 26.

Figure 3:
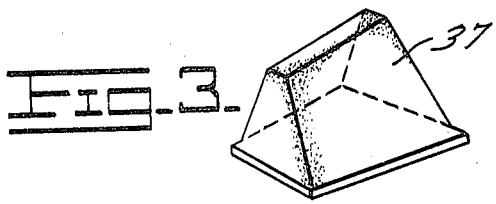
FIG. 3 is a perspective view of a resilient element utilized in the track chain assembly of FIGS. 1 and 2.

As shown in FIG. 3, each compression pad 37 comprises a resilient rubber block which tapers upwardly. Plates 38 diverge downwardly at a greater angle than the upward taper of the pads. Thus, as illustrated in FIG. 4, the shape of compression pad 37 and plates 38 are so related that as th pads move toward the plates, they are initially engaged by the plates only at the apex of the pads.

As the upper portion of the pads compresses upon further movement toward the plates, a progressively greater portion of the pads is engaged by the plates. As a result, compression pads 37 exhibit a progressive spring rate as they cushion upward deflection of the track rollers 28.

Due to the configuration of the track chain mounted on the track suspension of the present invention, a relatively light track tension is required for effective driving engagement of the track by the driving sprocket 19. Accordingly, the spring rate of the idler recoil pistons 25 may be low. As a result, a relatively large object may be easily overcome by relatively unrestrained vertical displacement of the lead idler until the track rollers and bogey encounter and absorb the entire load initiated by the obstacle.

Figure 5:
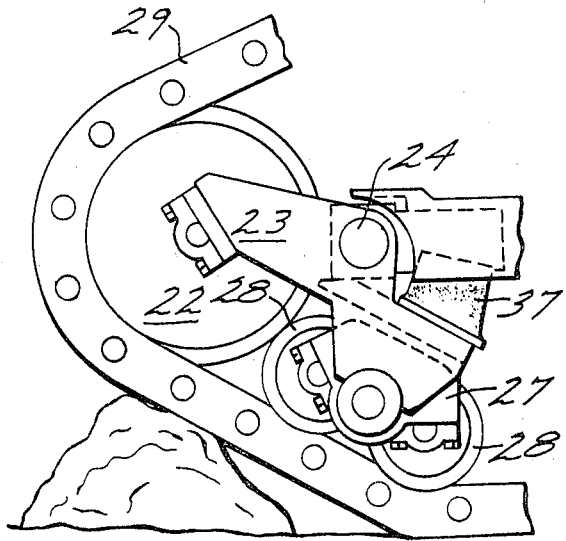
FIG. 5 is a view of a portion of the mechanism shown at FIG. 1 illustrating effects which occur when the track chain assembly encounters an obstacle.

The configuration of the track suspension of the present invention during negotiation of an obstacle is illustrated in FIG. 5.

As the idler ascends to overcome the obstacle, crank 23 pivots on trunnion 24, inherently urging the bogie-mounted rollers into a relatively light load area of the track. Consequently, the cycle time in which the track rollers pick-up the load encountered earlier by the track idler is shorter than in conventional track suspensions. The bogey-mounted rollers 28, in shifting forward, contribute to maintenance of proper track tension. Since the bogies are free to pivot on the crank 23, the track rollers encounter substantially lower shock loads than normal track rollers because of the bridging action afforded by the taut track.

As the obstacle is overcome, the crank 23 pivots on trunnion 24, returning the track rollers and idler to their original positions, at which time the rubber compression pads 37 return to engagement with plates 38, cushioning the track rollers as they pass over the obstacle.

As the load is absorbed by the track rollers, progressive deflection or compression of the pad will occur in the manner shown in FIG. 4 until it occupies substantially all of the nesting area between the two plates 38.

Upon initial contact with the obstacle, the forward idler and crank rotate on trunnion 24 to effect an advantageous change in the moment arm and load forces acting upon the suspension. The low spring rate allows the front idler and track to overcome an obstacle through a very aggressive effort of the track. The bridging action of the track rollers reduces substantially the load on the idler and the track rollers. In tests it has been found that this bridging action can reduce roller loads from a 37,000/87,000 pound range to a 14,000/22,000 pound range.

Figure 6:
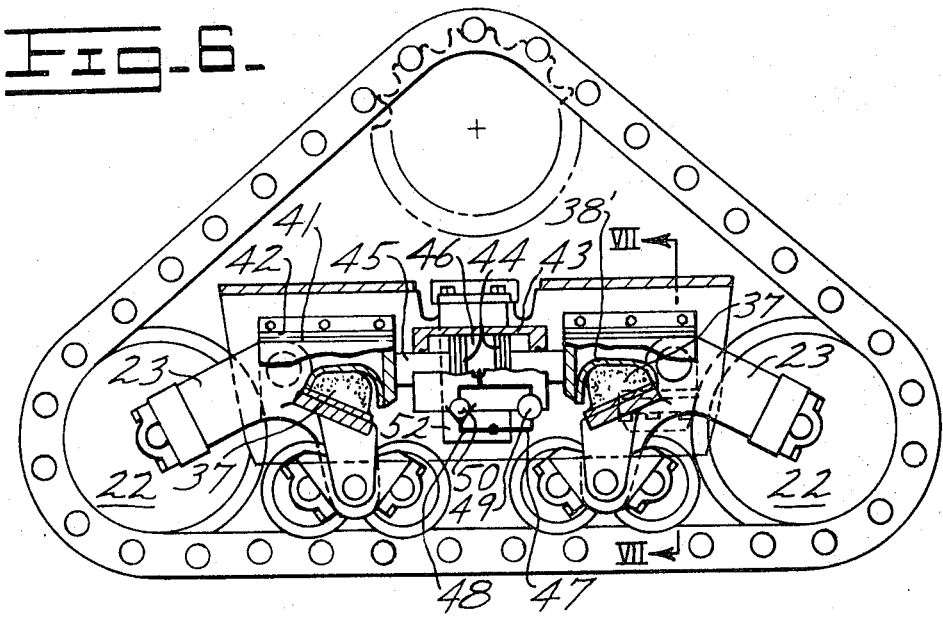
FIG. 6 is a side elevation view of a second embodiment of a crawler vehicle track assembly.
Figure 7:
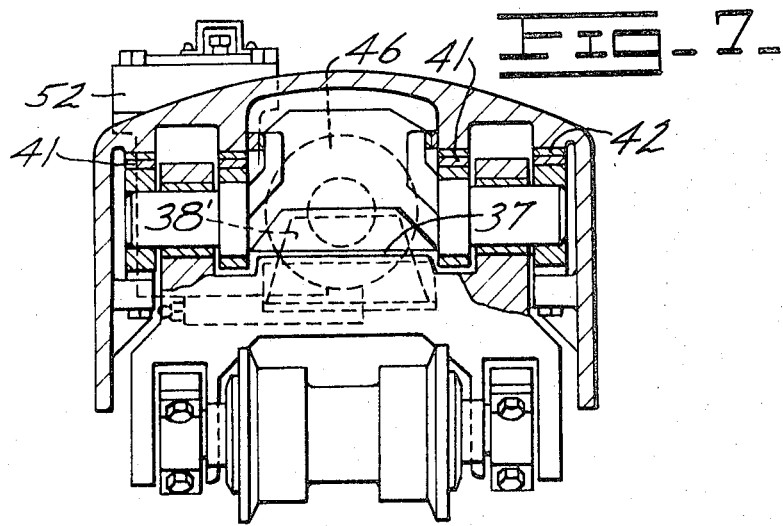
FIG. 7 is a sectioned view taken along the line VII—VII of FIG. 6.

An alternative embodiment of an idler recoil mechanism that may be employed in the triangular track suspension of the present invention to eliminate detrimental shear and abrasive wear of the compression pads 37 is shown in FIG. 6.

Another advantage of this embodiment is the use of a single, dual-purpose recoil cylinder to accommodate both front and rear idlers. In this embodiment, the cranks 23 are rotatably mounted on slide bearings 41 which are mounted for reciprocal movement on slides 42. Compression pads 37, mounted on the cranks 23, are engageable by plates 38' integrally formed on the slide bearings 41. Since the plates 38' recoil with the cranks 23, the compression pads 37 will not be subject to shear forces and abrasive conditions that would otherwise be encountered when the cranks recoil.

A single recoil cylinder 43 accommodates both the front and rear idlers. Pistons 44 disposed within the recoil cylinder have rods 45 extending therefrom which engage the slide bearings 41. Recoil cylinder 43 and pistons 44 define a chamber 46 which is filled with pressurized fluid. Chamber 46 communicates with an accumulator 52 through parallel conduits 47 and 48, having a relief valve 49 and a directional check valve 50 respectively disposed therein.

If a foreign object gets between an idler and the track, it will urge the idler and associated crank trunnion inwardly, moving a slide bearing 41. The slide bearing, engaging a piston rod 45, moves a piston 44 within the recoil cylinder 43 against the pressure fluid in the cylinder chamber 46 which is allowed to overcome relief walve 49 and bleed into accumulator 52, allowing the idler to recoil. When the foreign object is expelled, fluid pressure in the accumulator communicates with chamber 46 through conduit 48 and check valve 50.

Figure 8:
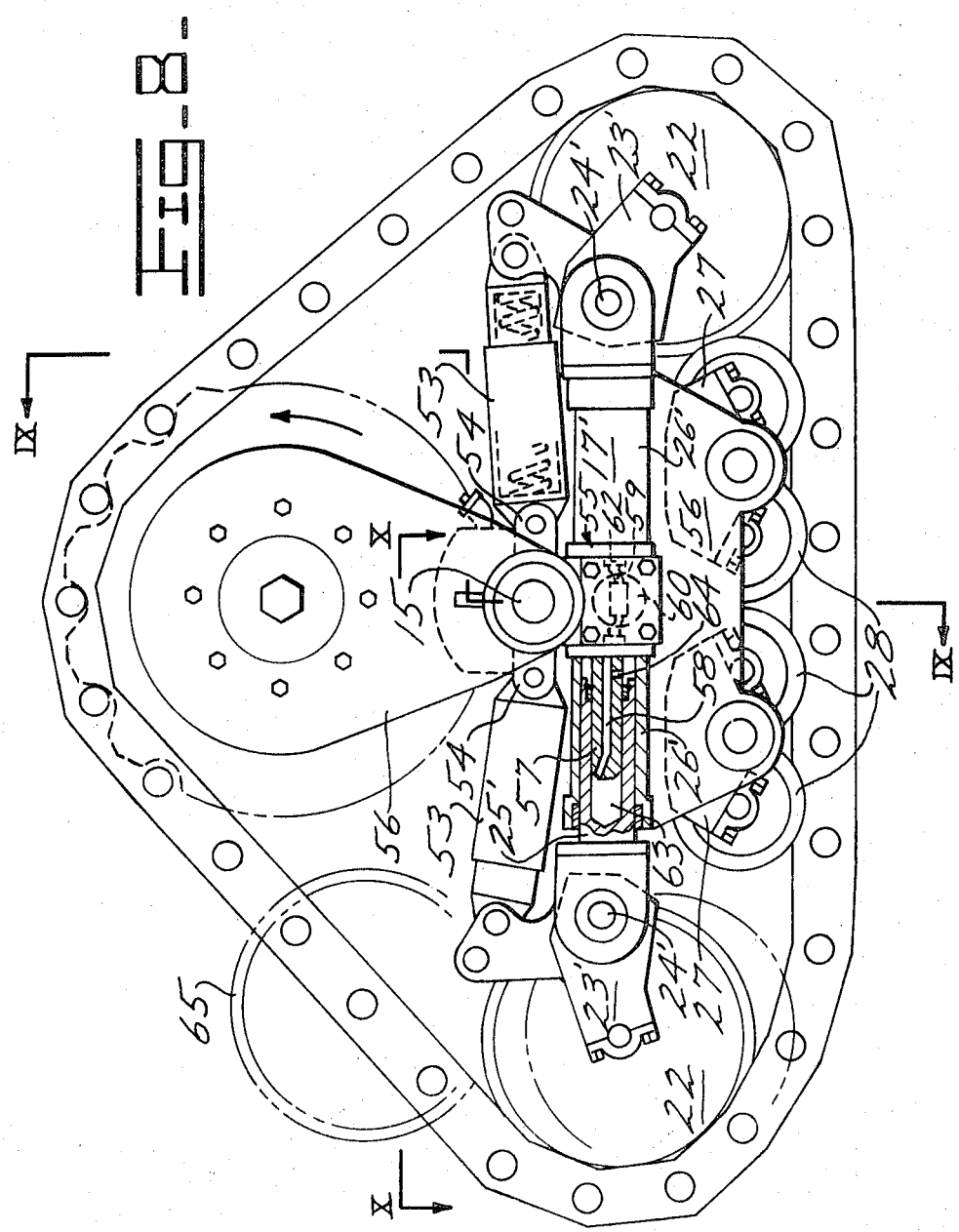
FIG. 8 is a side elevation view of still another crawler vehicle track chain assembly constituting a third embodiment of the invention.
Figure 9:
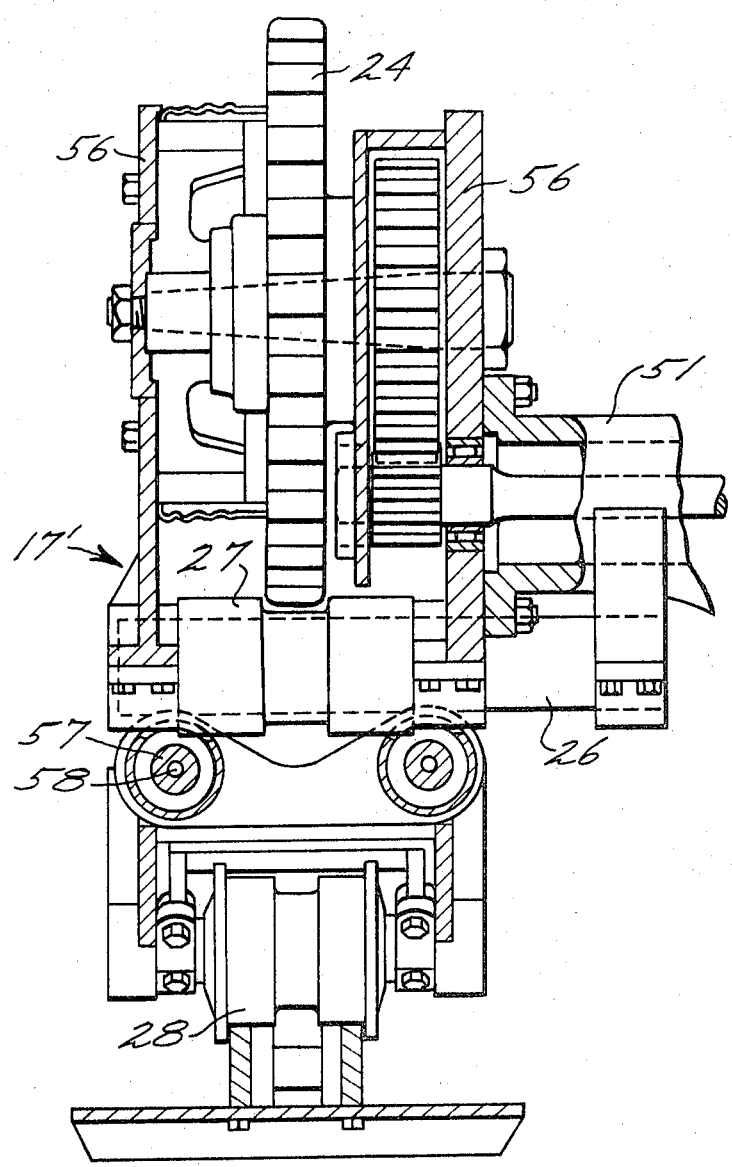
FIG. 9 is an elevation section view of the mechanism of FIG. 8 taken along line IX—IX thereof.

Another embodiment of the present invention is shown in FIG. 8. Idlers 22 are rotatably mounted on cranks 23' which are pivotally mounted by means of trunnions 24' on pistons 25' slidable within hydropneumatic cylinders 26' provided in oscillatable track frame 17'. The cranks 23' are preloaded and cushioned by preload springs 53 connected between the cranks and brackets 54 on main pivot shaft 15.

Suitable brackets 55 and side plates 56, forming the main structure of track frame 17', extend downwardly to permit two pairs of bogie-mounted track rollers 28 to be pivotally supported thereon.

The hydropneumatic cylinders 26', which provide for recoiling of the idlers, have stub shafts 57 disposed coaxially therein. Hollow tubular pistons 25' are journaled for reciprocation within cylinders 26' and on stub shafts 57. Stub shafts 57 are provided with passages 58 and lines 59 for communication with a nitrogen-charged accumulator 60. The precharge is sufficient to assure satisfactory pressure for the recoil mechanism and tension of the track. During driving of the track, inter-action with the suspension and sprocket automatically results in the rear or high loaded portion of the track being under tnsion which consequently results in the more lightly loaded front recoil cylinder 26' extending sufficiently for recoiling purposes and simultaneously maintaining desired track tension. Accumulator 60 is arranged laterally within the track frame 17' so that four lines 59 connected by fittings 62 may communicate pressure through passages 58 of shafts 57 to chambers 63 serving to load recoil pistons 25' when passages 64 are covered by pistons 25'.

In the event the direction of travel for the vehicle is reversed, the idler and piston previously in the rear will automatically extend while the piston and idler previously in the lead will automatically retract to compensate for load readjustment.

Sufficient vertical oscillation is permitted each idler 22 through pivoting of cranks 23' to overcome normal road obstacles, while oscillation of the entire track unit is accommodated by main pivot shaft 15. In the position of maximum displacement, shown by phantom lines 65, the track frame 17' contacts positive stops (not shown) provided intermediate the vehicle axle housing.

In this embodiment, the specific geometry provided the track frame and idlers in relation to the drive sprocket is such that the load vectors or reaction force of each recoil linkage is balanced within the system. Normally there is sufficient torque reaction from the driving force that a pivotally mounted track tends to walk around the sprocket or support bearing if unbalanced loading exists. In the present arrangement the new mean line of force resulting from vertical oscillation and/or recoiling of the idlers falls just above the main pivot shaft 15. With this inherent design advantage augmented by the weight distribution within the track nearly all detrimental reaction forces are neutralized. The particular arrangement of springs 53 and cranks 23' also results in parallelogram-type action that assures satisfactory clearance, oscillation, and tension of the track.

Still another embodiment of the track suspension of the present invention is illustrated in FIG. 11.

A tractor includes a frame 70, an engine 71 mounted on the frame, transmission 72 also mounted on the frame, a crank shaft 73 for transmitting power from the engine to the transmission, and a drive shaft 74 extending from the transmission. A drive sprocket 75 is rotatably mounted on the tractor frame 70 and driven by a gear 76 mounted on the end of drive shaft 74.

A track frame 77 is pivotally mounted on the tractor frame 70 by a pivot mounting 78. In this embodiment, a single track frame 79 is mounted on each side of the tractor vehicle toward the rear of the vehicle. The forwardly extending end of the track frame with respect to the pivot mounting is greatly elongated, and the rearwardly extending end of the track frame is relatively short.

Idlers 22 are rotatably mounted on one end of idler support members comprising cranks 80 and 81 respectively, which in turn are mounted on the rearwardly and forwardly extending ends of track frame 79. A bogie 27 is pivotally mounted on the other ends of crank 80 and 81, and has track rollers 28 rotatably mounted thereon which engage a track chain 29' encompassing idlers 22 and drive sprocket 75. An intermediate point of crank 80 is pivotally mounted on track frame 79.

Crank 81 has an intermediate point pivotally mounted on a slide 40' which in turn is mounted for reciprocation on slide bearing 42' mounted on track frame 79. A push rod 45' is connected between slide 41' and a piston 44' disposed in a recoil cylinder 43' mounted on track frame 79 and constructed similar to recoil cylinder 43 already described.

For additional support of the suspension on the track, trailing links 82 having bogies 27' pivotally mounted thereon, are also pivotally mounted on the track frame 79. The bogies in turn rotatably mount track rollers 28' which engage track chain 29'.

Crank members 80 and 81 and links 82 all have resilient blocks 37' mounted thereon for engagement with plates 38' to cushion pivoting of the crank members and links when the track rollers pass over a bump. Blocks 37' and plates 38' are similar to blocks 37 and plates 38 previously described, exhibiting a progressive spring rate as the crank members and links pivot with respect to the track frame.

The forward portion of tractor frame 70 is resiliently supported on track frame 79 by conventional means not shown.

Small idlers 84 and 85 rotatably mounted on tractor frame 70 maintain the track chain 29' in proper alignment between sprocket 75 and the forward idler 22.

I claim:

1. A vehicle supporting and driving assembly for a vehicle having an axle housing and a drive axle in the axle housing comprising:
   a main pivot shaft securable to said axle housing,
   a track frame having an intermediate point secured to the main pivot shaft for pivotal oscillation of the track frame with respect to said axle housing, and having first and second ends extending from said intermediate point, idler support members at the first and second ends of the track frame, means pivotally and reciprocably securing the idler support members to the track frame ends, idlers rotatably mounted on the idler support members, cushion means responsive to reciprocation of the idler support members with respect to the track frame ends to cushion recoil of the idlers, a rotatable drive sprocket attachable to said axle housing and positioned between the ends of said track frame and above the idlers, means driving the rotatable drive sprocket by the drive axle, and a track chain emcompassing the idlers and drive sprocket and in driven engagement with the drive sprocket.

2. The combination of claim 1 wherein said idler support members comprise cranks having an intermediate point secured to the track frame ends and first and second legs diverging therefrom, said idlers being mounted on said first legs.

3. The combination of claim 2 further comprising,
bogies pivotally mounted on the second legs of the cranks, and
track rollers rotatably mounted on the bogies and engaging the track chain.

4. The combination of claim 1 further comprising,
bogies pivotally mounted on the track frame, and
track rollers rotatably mounted on the bogies.

5. The combination of claim 1 wherein said means pivotally and reciprocably securing the idler support members to the track frame ends comprises,
cylinder means provided on the track frame ends, and,
pistons slidable within the cylinder means,
and wherein the idler support members are pivotally mounted on the pistons.

6. The combination of claim 5 wherein said cushion means comprises,
second cylinders provided in the pistons, and
pilot pistons disposed in the second cylinders, the pilot pistons and second cylinders defining gas chambers, and the cylinders, pistons and pilot pistons defining fluid chambers, whereby the gas chambers and fluid chambers may be filled with fluids to cushion recoil of the idlers and to maintain the track chain at any desired tension.

7. The combination of claim 5 wherein said cushion means comprises,
an accumulator,
stub shafts disposed in said cylinders,
second cylinders formed in said pistons whereby the pistons are reciprocable within said cylinders and on said stub shafts, and
conduit means communicating the cylinders and the second cylinders formed in the pistons with the accumulator.

8. The combination of claim 1 wherein said means pivotally and slidably securing the idler support members to the track frame comprises,
slides secured to the track frame,
slide bearings slidable on the slides and pivotally mounting the idler support members,
cylinder means secured to the track frame,
piston means slidable within the cylinder means and in abutting engagement with the slide bearings, the cylinder means and piston means defining a fluid chamber,
an accumulator,
first and second parallel conduits communicating the fluid chamber with the accumulator,
a relief bleed valve in the first conduit, and
a check valve disposed in the second conduit, whereby upon restriction of the fluid chamber by movement of the piston means, the relief valve will open and fluid in the chamber will bleed into the accumulator, and upon subsequent expansion of the fluid chamber the check valve will open allowing fluid in the accumulator to return to the chamber.

9. The combination of claim 1 further comprising, housing means secured to the axle housing and extending upward therefrom, and wherein the drive sprocket is mounted on the housing means.

10. The combination of claim 1 further comprising resilient means responsive to pivoting of the cranks on the track frame.

11. The combination of claim 10 wherein the resilient means comprises spring means connecting the cranks and the main pivot shaft.

12. The combination of claim 10 wherein said resilient means comprises compression pads arranged for compression between the cranks and the track frame upon pivoting of the cranks.

13. The combination of claim 12 wherein said compression pads exhibit a progressive spring rate.

14. The combination of claim 13 wherein said compression pads comprise rubber blocks and wherein compression plates are provided on the track frame which progressively engage more and more of the block as it is moved toward the plates.

* * * * *